United States Patent [19]

Hoskin

[11] Patent Number: 4,915,170

[45] Date of Patent: Apr. 10, 1990

[54] ENHANCED OIL RECOVERY METHOD USING CROSSLINKED POLYMERIC GELS FOR PROFILE CONTROL

[75] Inventor: Dennis H. Hoskin, Lawrenceville, N.J.

[73] Assignee: Mobil Oil Corporation, New York, N.Y.

[21] Appl. No.: 322,330

[22] Filed: Mar. 10, 1989

[51] Int. Cl.$^4$ .................... E21B 33/138; E21B 43/22; E21B 43/24

[52] U.S. Cl. .................................... 166/252; 166/270; 166/272; 166/273; 166/295; 166/300

[58] Field of Search ............... 166/252, 270, 272, 273, 166/274, 295, 300

[56] References Cited

U.S. PATENT DOCUMENTS

| | | | |
|---|---|---|---|
| 3,243,000 | 3/1966 | Patton et al. | 175/65 |
| 3,305,016 | 2/1967 | Lindblom et al. | |
| 3,573,263 | 3/1971 | Gill | |
| 3,810,882 | 5/1974 | Browning et al. | |
| 3,918,521 | 11/1975 | Snavely, Jr. et al. | 166/272 |
| 4,009,755 | 3/1977 | Sandiford | 166/270 |
| 4,016,931 | 4/1977 | Cryar, Jr. | 166/295 X |
| 4,069,869 | 1/1978 | Sandiford | 166/270 |
| 4,085,802 | 4/1978 | Sifferman et al. | 166/295 |
| 4,147,211 | 4/1979 | Sandiford | 166/270 |
| 4,342,866 | 8/1982 | Kang et al. | 536/119 |
| 4,413,680 | 11/1983 | Sandiford et al. | 166/270 |
| 4,440,228 | 4/1984 | Swanson | 166/274 |
| 4,479,894 | 10/1984 | Chen et al. | 252/8.554 |
| 4,489,783 | 12/1984 | Shu | 166/272 |
| 4,565,249 | 1/1986 | Pebdani et al. | 166/303 |
| 4,606,407 | 8/1986 | Shu | 166/270 |
| 4,630,678 | 12/1986 | Mumallah et al. | 166/295 X |
| 4,644,020 | 2/1987 | Stahl | 522/79 |
| 4,735,265 | 4/1988 | Hoskin et al. | 166/270 X |
| 4,785,028 | 11/1988 | Hoskin et al. | 523/130 |
| 4,787,451 | 11/1988 | Mitchell | 166/270 |
| 4,796,700 | 1/1989 | Sandiford et al. | 166/270 |
| 4,811,787 | 3/1989 | Navratil et al. | 166/295 X |

*Primary Examiner*—George A. Suchfield
*Attorney, Agent, or Firm*—Alexander J. McKillop; Charles J. Speciale; Michael J. Mlotkowski

[57] ABSTRACT

A method for controlling the permeability profile of a subterranean oil-bearing formation utilizing polymeric gel-forming compositions which gel in-situ. The method comprises the steps of determining an amount of polymeric gel required for profile control; introducing a first aqueous gel-forming composition in a non-gelatinous state into the formation in an amount which is a portion of the total gel requirement; and, introducing into the formation in a non-gelatinous state at least a second aqueous composition capable of forming a gel at a rate in excess of the first gel-forming composition wherein the gelation of all compositions proceeds in timed relation such that each solution gels at approximately the same time. The method so described reduces reservoir shut-in time and is especially useful in the treatment of large reservoirs.

20 Claims, No Drawings

ENHANCED OIL RECOVERY METHOD USING CROSSLINKED POLYMERIC GELS FOR PROFILE CONTROL

FIELD OF THE INVENTION

This invention relates to a method for the use of aqueous gel-forming compositions for the control of permeability in subterranean oil-bearing formation during enhanced oil recovery operations.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that produced by primary methods, a variety of supplemental production techniques have been employed. In these supplemental techniques, commonly referred to as secondary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of an aqueous or carbon dioxide flooding medium into an oil-bearing formation, either alone or in combination with other fluids. In practice, a number of injection and production wells are used in a given field. These are generally arranged in conventional patterns such as a line drive, a five spot or inverted five spot, or a seven spot or inverted seven spot.

In the use of the various fluid flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered in fluid flooding is that certain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a problem brought by the fact that different regions or strata may have different permeabilities. When this is encountered, the drive fluid can preferentially enter regions of higher permeability due to their lower resistance to flow. The regions of lower permeability, where significant volumes of oil often reside, are left unswept and do not benefit from the use of such secondary or tertiary recovery techniques.

It is therefore often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a viscous slurry capable of sealing off the most permeable layers so that the drive fluid would be diverted to the underswept, "tighter" regions of the reservoir, became evident. This led to the use of oil/water emulsions, as well as gels and polymers for controlling formation permeability. This process is frequently referred to as "profile" control, a reference to the control of the vertical permeability profile of the reservoir. Profile control agents which have been proposed include oil/water emulsions and polymeric gels, with polymeric gels being the most extensively applied in recent years.

There are a variety of materials commercially available for profile control, all of which perform differently and have their own, often unique limitations. Among the many polymers examined are polyacrylamides, polysaccharides, celluloses, furfural-alcohol and acrylic-epoxy resins, silicates and polyisocyanurates. For polyacrylamides, see J. C. Mack, "Process Technology Improves Oil Recovery," SPE 7179, *SPE Rocky Mountain Regional Meeting*, May 17–19, 1978. Cody, Wyo.; W. G. Routson, M. Neale, and J. R. Penton, "A New Blocking Agent for Water Channeling," SPE 3992, 47th Annual Fall Meeting of SPE-AIMR, Oct. 8–11, 1972, San Antonio; D. Sparlin, "An Evaluation of Polyacrylamides for Reducing Water Production," *J. Pet. Tech.*, 906–914, August, 1976; and G. P. Willhite and D. S. Jordan, "Alteration of Permeability in Porous Rocks with Gelled Polymers," 1981 *ACS Meeting*, Aug. 23–28, New York, Polymers Preprints. For polysaccharides, see R. W. Farley, J. F. Ellebracht, and R. H. Friedman, "Field Test of Self-Conforming Oil Recovery Fluid," SPE 5553, *50th Annual Fall Meetings of SPE-AIME*, Sept. 28–Oct. 1, 1975, Dallas. For furfural-alcohol and acrylic/epoxy resins, see R. H. Knapp, M. E. Welbourn, "Acrylic/Epoxy Emulsion Gel System for Formation Plugging: Laboratory Development and Field Testing for Steam Thief Zone Plugging," SPE 7083, *Symposium on Improved Oil Recovery*, Apr. 16–19, 1978, Tulsa; and P. H. Hess, C. O. Clark, C. A. Haskin and T. R. Hall, "Chemical Method for Formation Plugging," *J. Pet. Tech.*, 559–564, May, 1971. For polyisocyanurates, see C. T. Presley, P. A. Argabright, R. E. Smith, and B. L. Phillips, "A New Approach to Permeability Reduction," SPE 4743, *Symposium on Improved Oil Recovery*, Apr. 22–24, 1974 Tulsa).

A major part of the work conducted in this area has dealt with polyacrylamides. Polyacrylamides have been used both in their normal, non-crosslinked form as well as in the form of crosslinked metal complexes, as described, for example, in U.S. Pat. Nos. 4,009,755, 4,069,869 and 4,413,680. In either form, the beneficial effects derived from these polyacrylamides seem to dissipate rapidly due to shear degradation during injection. To overcome this problem and achieve deeper penetration into the reservoir, dilute solutions of these polymers have sometimes been injected first and then complexed in-situ. For example, in one such process, three sequential injection steps are employed: cationic polyacrylamides are injected first for strong adsorption and anchoring onto the generally anionic sites of the reservoir rock surfaces, followed by chelation with aluminum ions provided by aluminum citrate or with chromium ions generated by the in-situ reduction of dichromate ions and finally, anionic polyacrylamides are injected for the formation of the desired cationic polymer-metal ion-anionic polymer complexes (J. E. Hassert, and P. D. Flemming, III, "Gelled Polymer Technology for Control of Water in Injection and Production Wells," 3rd *Conferences on Tertiary Oil Recovery,* University of Kansas, Lawrence, 1979).

In general, there are two ways to deliver polymer gels into the formation. The first method is to inject gelled polymer into the formation. This is the so-called surface gelation method. The advantage of this method is that the polymer will enter the loose zone in preference to the tight zone because of the high viscosity of gelled polymer. The other advantage is that gelation is ensured because the gel is prepared on the surface. The disadvantage of this method is that the polymer gel will probably not penetrate far enough to block a high pore volume of the designated zone at low pumping pressures and low pumping rates, especially when the pressure drop occurs rapidly within a small radius of the injection wellbore. At high pumping pressures and flow rates, there are increased risks of fracturing the reservoir and degrading the gel structure by high shear forces.

The second method is the so-called in-situ gelation method. One in-situ gelation technique is carried out by injecting separate slugs of polymer, one containing an inactive crosslinker (such as dichromate) and the other activator (reducing agents such as thiourea and bisulfite), sequentially into the reservoir. Gelation occurs when the two parts meet in the reservoir. With this technique, shear degradation is reduced and the penetration of polymer is improved because of the lower viscosity of the ungelled polymer. However, a disadvantage of this method is that there is no guarantee that the two slugs of treatment will be placed in the same area and mixed well enough to form a strong gel. To avoid this problem, it would be advantageous to inject the constituents of the gel-forming composition simultaneously, or after first premixing them prior to injection. However, the majority of gel-forming compositions known in the art are relatively fast acting in that they begin to gel rather quickly. The proper placement of large volume treatments can be inhibited by such fast-acting gels as the treatment flow path begins to plug.

Profile control treatments must be properly performed for maximum effect; large treatments, injected over many days, are often needed. In most reservoirs thief zones are not isolated from other zones. If a small amount of the thief zone is plugged with a profile control treatment, injected fluids may be diverted only for a few feet away from the wellbore and soon find their way back into the thief zone. Much larger profile control treatments, while often suffering from the same problem, will recover much more oil because a much larger volume of the reservoir will be swept before the fluids flow back into the thief zone.

In thick reservoirs or those with large well spacing, many days are often required to pump the profile control treatment into place due to the large volume of injectant necessary. Also a factor is that the pumping rate to place a profile control gel is usually limited by the parting pressure of the reservoir. These factors require in-situ gelling profile control formulations to crosslink very slowly. In the simplest case, if 16 days are needed to place the treatment, it must be designed to gel in 16 days. This means that the well should be shut-in (taken out of the producing mode), for 16 days after injection is complete so the whole treatment will gel before returning the well to fluid flood injection or production. This results in a tremendous waste of time as well as money from lost oil production.

Therefore, what is needed is a method for effectively treating a large reservoir with a profile control agent which minimizes shut-in time after treatment, yet permits the placement of a large volume of such agent within the reservoir.

Accordingly, it is an object of the present invention to provide a method of attaining improved profile control of subterranean oil-bearing stratified reservoirs.

It is another object of the present invention to make practical fluid flooding enhanced oil recovery operations in larger reservoirs from the perspective of cost and efficiency.

It is yet another object object to minimize reservoir shut-in time following the placement of a profile control treatment.

Other objects, aspects and the several advantages of the present invention will become apparent to those skilled in the art upon a reading of the specification and the claims appended thereto.

SUMMARY OF THE INVENTION

According to the present invention, there is provided a method for enhancing the amount of oil recovered from a subterranean oil-bearing formation having zones of varied permeability by controlling the permeability profile of the formation. The method of the present invention comprises the steps of determining an amount of polymeric gel required for controlling the profile of the formation, introducing a first aqueous gel-forming composition in a non-gelatinous state into the formation in an amount which is a portion of the amount required for profile control; and, introducing into the formation in a non-gelatinous state at least a second gel-forming composition capable of gelling under subterranean formation conditions at a rate in excess of that of the first aqueous gel-forming composition, this solution being introduced in an amount which is the remaining portion required for formation profile control. The gelation of the gel-forming compositions proceeds in timed relation such that each solution gels at substantially the same point in time.

DESCRIPTION OF THE PREFERRED EMBODIMENTS

The present invention is directed to a method which utilizes at least two polymeric gel-forming compositions exhibiting different rates of gelation under subterranean formation conditions. In the practice of this invention, a first gel-forming composition is injected in a non-gelatinous state into the formation through either an injection well, a production well or both, each of which extend from the surface of the earth into the formation. It is preferred that this first composition have a rate of gelation that is less than all other such compositions to be subsequently introduced and it is most preferred that this first composition be designed to form a stable gel as close as possible in time to the completion of the injection of the total profile control treatment. This "delayed" gelation is advantageous from the standpoint that it permits larger quantities of gel-forming polymeric material to be introduced into the formation without experiencing constriction of the treatment flow path and subsequent sealing off of zones of lower permeability—zones which are potentially oil-bearing. At a point in time determined on the basis of the volume of treatment required, the achievable injection rate and the gel-forming characteristics of the compositions to be utilized, the injection of the first composition is terminated and the introduction of a second composition is begun. Additional gel-forming compositions may be subsequently injected, if desired. It is preferred that the various gel-forming compositions which comprise the total profile control treatment be injected serially. Reservoir shut-in time is minimized by selecting each subsequent composition with the goal that gelation of the total profile control treatment be achieved close in time to the completion of the treatment. Once the polymer has been placed in the formation to control permeability and the flooding operation begun in the normal manner by injection of the flooding fluid (e.g., water through the injection well), recovery of oil displaced by the flooding fluid can be made through the production well. The production well is situated on a horizontal distance or offset from the injection well. In a full scale operation, a number of wells will be used although the principle of operation will be the same. The wells may be placed in various arrangements, as is conventional in operations of this kind.

Any water-soluble or water-dispersible polymer capable of forming aqueous gels in the presence of a crosslinking agent can be used in the practice of this invention. Polymers of natural origin and biopolymers may be used. Preferred polymers include the various polyacrylamides and related polymers which are either water-soluble or water-dispersible and which can be used in an aqueous medium with the gelling agents described herein to yield an aqueous gel. These can include the various substantially linear homopolymers and copolymers of acrylamide and methacrylamide. By substantially linear is meant that the polymers are substantially free of crosslinking between the polymer chains. The polymers can have up to about 50 percent of the carboxamide groups hydrolyzed to carboxyl groups. However, as the degree of hydrolysis increases, the polymers often become more difficult to disperse in brines, especially hard brines. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Examples of copolymers which can be used in the practice of the invention include the water-dispersible copolymers resulting from the polymerization of acrylamide or methacrylamide with an ethylenically unsaturated monomer. It is desirable that sufficient acrylamide or methacrylamide be present in the monomer mixture to impart to the resulting copolymer the above-described water-dispersible properties. Any suitable ratio of monomers meeting this condition can be used. Under proper conditions of use, examples of suitable ethylenically unsaturated monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529, 2,740,522, 2,727,557, 2,831,841, and 2,909,508. These copolymers can be used in the hydrolyzed form, as discussed above for the homopolymers.

A group of copolymers useful in the practice of the present invention are the copolymers of acrylamide or methacrylamide and a monomer such as the well known 2-acrylamido-2-methyl-propanesulfonic acid AMPS ® monomer. (AMPS ® is the registered trademark of the Lubrizol Corporation of Cleveland, OH.) Useful monomers, such as the AMPS ® monomer, and methods for their preparation are described in U.S. Pat. Nos. 3,507,707 and 3,768,565, the disclosure of which is incorporated by reference. The AMPS ® monomer is commercially available from the Lubrizol Corporation. The alkali metal salts, such as sodium 2-acrylamido-2-methylpropane sulfonate are also useful in the practice of this invention. These are also readily available.

Copolymers of acrylamide with said AMPS ® monomer, and/or its sodium salt, are known and useful in the practice of this invention. For an example of such a copolymer, see the above-mentioned U.S. Pat. No. 3,768,565. A number of these copolymers are available from Hercules Incorporated, Wilmington, Del.; for example, Hercules SPX-5024, a 90:10 acrylamide/AMPS ® sodium salt copolymer; Hercules SPX-5022, an 80:20 acrylamide/AMPS ® sodium salt copolymer; Hercules SPX-5023, a 50:50 acrylamide/AMPS ® sodium salt copolymer; and Hercules SPX-5025, a 30:70 acrylamide/AMPS ® sodium salt copolymer.

Another group of copolymers useful in the practice of the invention are the copolymers of acrylamide or methacrylamide with a monomer such as those which are the subject of U.S. Pat. No. 3,573,263, the disclosure of which is incorporated by reference in its entirety. These useful monomers include the well known commercially available material (acryloyloxyethyl) diethylmethyl ammonium methyl sulfate, commonly referred to as DEMMS and the commercially available material (methacryloyloxyethyl) trimethylammonium methylsulfate also known as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten ® 210, a 90:10 acrylamide/MTMMS copolymer; and Hercules Reten ® 220, an 80:20 acrylamide/MTMMS copolymer.

A particularly preferred polymeric material for use in the practice of this invention is the class of high molecular weight vinyl lactam polymers and copolymers disclosed in U.S. Pat. No. 4,644,020, which is hereby incorporated herein in its entirety. An example of a commercially available copolymer of this type is Phillips HE-B ®, which is a copolymer of N-vinyl-2-pyrrolidone and acrylamide. This thermally stable, brine tolerant copolymer is available from Phillips Petroleum Company, Inc., of Bartlesville, OK.

Other copolymeric materials which when used to form aqueous gels can benefit from the novel aspects of this invention are disclosed in U.S. Pat. No. 4,785,028, the contents of which are incorporated by reference in their entirety.

The polymers are generally used at concentrations ranging from 1,000 to 5,000 ppm in order in order to achieve the desired gel consistency; in most cases, however, concentrations of 1,000 to 3,000 ppm will be adequate and about 2,000 ppm is normally preferred, although reservoir conditions may require other concentrations.

While gel-forming compositions having the requisite variation in gelation rate necessary to practice the method of this invention may be obtained in a variety of ways, it is preferred that the crosslinking agent component of the compositions be used to achieve the differing gelation rates. By so doing, the polymer component used throughout the sequential injection of the gel-forming compositions can remain the same; although, it is within the scope of this invention to use two or more polymeric materials.

Crosslinking agents useful in the practice of the present invention include mixtures of naphtholic or phenolic compounds and aldehydes, phenolic resins, amino resins and compounds of a polyvalent metal such as aluminum, zirconium or a metal of the first series of transition metals. Suitable crosslinking agents include polyvalent metal cations such as $Al^{+3}$, $Cr^{+3}$, $Fe^{+3}$, $Sb^{+3}$ and $Zr^{+4}$. Also suitable for crosslinking are multifunctional amines such as diamines. For example, aluminum citrate can be admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with an oxidant.

In the practice of this invention, a pre-formed phenolic resin can be used; such resin generally obtained by the condensation of phenol or substituted phenols with an aldehyde such as formaldehyde, acetaldehyde and furfural. Additionally, the phenol and aldehyde constituents can be added separately to produce the compositions of this invention, rather than being added as a pre-formed phenolic resin.

Any suitable water-dispersible phenol can be used in the practice of this invention. Phenolic compounds suitable for use in the present invention include phenol, resorcinol, catechol, 4,4'-diphenol, 1,3-dihydroxynaphthalene, pyrogallol, phloroglucinol and other similar compounds. Resorcinol and phenol are the preferred phenolics when seeking to achieve relatively short gelation times, while esterified phenolic compounds may be used to form much slower reacting crosslinking agents. The choice of a phenol compound will be based largely on the rate of gelation desired. Mixtures of the named phenols are also believed to be useful.

A broad range of water-dispersible aldehydes are useful in the practice of the present invention. It is known that both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, propionaldehyde, butylaldehyde, isobutylaldehyde, heptaldehyde and others. Among the useful dialdehydes are glyoxyl, glutaraldehyde and terephthaldehyde. Mixtures of the various, aforementioned aldehydes are also useful in the practice of the present invention. Of the preferred aldehyde compounds, formaldehyde is particularly preferred.

Amino resins may either be preformed resins, such as the preferred melamine/formaldehyde resins, mixtures of amino compounds and aldehyde compounds or mixtures of preformed resins and aldehyde compounds. The aforementioned aldehyde compounds are also useful in the amino resin crosslinking agents of this invention. Particularly preferred amino resins are disclosed in U.S. Pat. No. 4,787,451, which is incorporated by reference in its entirety.

Of the transition metal ions useful in the practice of this invention, $Cr^{+3}$ ions are particularly preferred for forming gels. Chromic nitrate and chromic chloride may also be utilized to form gels. The pH may optionally be adjusted before crosslinking. Redox systems such as sodium dichromate and sodium bisulfite can be utilized to obtain $Cr^{+3}$ ions. Similar redox systems are described in U.S. Pat. No. 3,749,172, which is hereby incorporated by reference. When forming relatively fast acting gels, $Cr^{+3}$ ions may be used in a preferred amount of from about 100 to 750 ppm.

To treat large oil-bearing reservoirs in the manner disclosed herein, crosslinking agents capable of producing a delayed gelation reaction are required. These crosslinking agents are advantageously related to the aforementioned agents. For example, so-called "hidden" or "protected" phenolics and naphtholics may be employed. These are phenol or naphthol derivatives which hydrolitically or thermally convert back to basic phenols or naphthols in the reservoir. In its derivative form, the phenol or naphthol compound is essentially non-reactive as a crosslinking agent for the polymeric solution; however, upon hydrolitic conversion, a reactive material is produced. Esterified phenols and naphthols are examples of such delayed crosslinking agents.

An example of a transition metal crosslinking agent capable of producing a delayed gelation reaction is the hexaquo $Cr^{+3}$. This species is relatively ineffective as a crosslinking agent but is slowly converted to a more effective olated species by hydrolysis. As such, simple chromium salts which produce the $Cr^{+3}$ ion in aqueous solution are delayed crosslinking agents. On being dissolved in water, the hexaquo complex $Cr(OH)_6^{3-}$ is produced and undergoes gradual hydrolysis over a period of about two to four days at room temperature to produce the reactive olated species which then participates in a rapid crosslinking reaction with the polymer. Simple chromic salts which may be used in this way include $CrCl_3, Cr(NO_3)_3, Cr_2(SO_4)_3$ and their hydrates. They have a gel time which corresponds to the rate of hydrolysis, about two to four days at room temperature.

Other methods of producing a delayed gelation may also be used. These, in general, are based on systems which produce either the hexaquo $Cr^{+3}$ complex ion in solution which then undergoes slow hydrolysis to form more reactive species or the more highly hydrolyzed species which are relatively less active for crosslinking. A system of the first kind is exemplified by the redox reduction of chromium from its higher oxidation states under conditions of low pH, e.g, when the redox reaction is carried out at a proton to chromium compound ratio of about 5:1 or higher. As mentioned above, this produces the hexaquo $Cr^{+3}$ ion in solution which hydrolyzes over a period of about two to four days to gel the polymer in the same period of time. The systems of the second kind, which are believed to form the highly hydrolyzed species have a greatly extended gel time of about two to three weeks under ambient conditions. They are exemplified by the reaction products obtained from alkalies and chromic salts at equivalent ratios of at least about 3:1 (alkali to chromic salt), and by the chromium reduction redox systems operating under neutral or basic conditions or at proton to chromium compound ratios of less than about 1:1. As mentioned above, the reduction of chromium from its higher oxidation states under these conditions is believed to result in the gradual formation of highly hydrolyzed species of low reactivity towards crosslinking.

Other chromium species which exhibit an extended gel time of about two to three weeks are the $Cr^{+3}$ hydrosols which may be prepared, for example, by heating a $Cr^{+3}$ salt at 60° C. to 90° C. for about two to four days in the presence of sulfate ion, $(SO_4)^{2-}$. U.S. Pat. No. 4,606,707 is particularly instructive as to these and the aforementioned delayed transition metal crosslinkers and is hereby incorporated by reference in its entirety.

As is understood by those skilled in the art, the amount of $Cr^{+3}$ ions, or other transition metal ions, utilized will vary depending upon the molecular weight of the particular polymer utilized. In any event, the metal ions should be present in an amount sufficient to obtain the desired gelling effect.

Gels resultant from crosslinking of an acrylamide copolymer are formed in a preferred range between about pH 5 and pH 8 when forming with $Cr^{+3}$ and in a preferred range between about pH 3 and pH 10 with other crosslinking agents. These gels can be formed in fresh water, distilled water and synthetic sea water.

The amount of organic crosslinking agent useful in the practice of this invention will generally be a small but effective amount sufficient to initiate and cause gelation of an aqueous solution of the polymeric material. It will generally be found that the amount of preformed amino or phenolic resin useful to form advantageous gels will be in the range of 0.02 to 5.0 weight percent. When mixtures of organic compounds are employed as crosslinking agents, the amount of the amino, phenol or naphthol compound used will be in the range of 0.01 to about 2.0 weight percent, with concentrations of 0.05 to 1.0 weight percent generally preferred. The concentration of aldehyde used will be in the range of 0.01 to 3.0 weight percent, with concentrations of 0.1 to 1.0 weight percent generally preferred.

The present invention is further illustrated by the following non-limiting prophetic example:

EXAMPLE

To treat a relatively large well, it is determined that 36,000 barrels of profile control gel treatment are necessary. Phillips HE-B ®, a thermally stable, brine tolerant polyacrylamide is selected as the polymer to be used to obtain the requisite aqueous gel-forming compositions. It is determined that aqueous solutions of Phillips HE-B ® may be placed into the zones of higher permeability of the well at a rate of 100 barrels per hour; and, as such, fifteen days will be required to place the total profile control treatment.

Four gel-forming compositions, all based upon the Phillips HE-B ® polyacrylamide, are chosen for the treatment. Selections are made on the basis of laboratory tests which simulate in-situ reservoir conditions. Each composition is to utilize a different crosslinking agent, selected from among those described above. Details of this treatment are given below:

TABLE 1

| | | 36,000 Barrel Profile Control Treatment Injection Rate = 100 bbl/hr | | |
|---|---|---|---|---|
| Composition | Polymer | Time Required To Form Stable Gel | Duration of Injection | Barrels Injected |
| A | HE-B ®[1] | 2 Weeks | 7 Days | 16,800 |
| B | HE-B ® | 1 Week | 4 Days | 9,600 |
| C | HE-B ® | 4 Days | 3 Days | 7,200 |
| C | HE-B ® | 1 Day | 1 Day | 2,400 |

[1]Phillips HE-B ® polyacrylamide. May be obtained from Phillips Petroleum Co. of Bartlesville, OK.

As indicated, the crosslinking agent of composition A is selected to gel that composition within about two weeks, with the crosslinking agents of compositions B, C and D selected to gel those compositions within about one week, four days and one day, respectively. Since the crosslinking agent is the only constituent of the four compositions which differs, injection may be advantageously carried out by mixing the components "on-the-fly". As such, injection of the polymer component, water or brine, plus any other needed additives could continue substantially unchanged for the total fifteen day treatment, with only the crosslinking agent changed-out according to the schedule proposed in Table 1. With on-the-fly mixing of the gel-forming compositions, shut-in time is reduced by using the method of the present invention from fourteen days to six days. Further optimization is possible, as those skilled in the art will plainly recognize.

The method of this invention can be utilized during a waterflooding process for the recovery of oil from a subterranean formation. After plugging the more permeable zones of a reservoir in the manner disclosed above, a waterflooding process can be commenced or resumed. U.S. Pat. No. 4,479,894, issued to Chen et al., describes one such waterflooding process. This patent is hereby incorporated by reference in its entirety.

Steamflood processes which can be utilized in conjunction with the profile control method described herein are detailed in U.S. Pat. Nos. 4,489,783 and 3,918,521 issued to Shu and Snavely, respectively. These patents are hereby incorporated by reference herein.

The method described herein can also be used in conjunction with a carbon dioxide flooding process, either alone, or in conjunction with a cyclical steam stimulation in a heavy oil recovery process to obtain greater sweep efficiency. Cyclical carbon dioxide steam stimulation can be commenced or resumed after plugging the more permeable zones of the reservoir as discussed above. A suitable process is described in U.S. Pat. No. 4,565,249 which issued to Pebdani et al. This patent is hereby incorporated by reference in its entirety. Increased sweep efficiency can be obtained when the method of this invention is used in combination with a carbon dioxide process for recovering oil. Prior to commencement or resumption of the carbon dioxide process, the more permeable zones are plugged.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A method of enhancing the amount of oil recovered from a subterranean oil-bearing formation having zones of varied permeability by controlling the profile thereof, comprising the steps of:
   (a) determining an amount of polymeric gel required for controlling the profile of the formation;
   (b) introducing a first aqueous gel-forming composition in a non-gelatinous state into the formation, said first composition introduced in an amount which is a portion of the amount required for profile control; and
   (c) introducing into the formation in a non-gelatinous state at least a second aqueous composition capable of forming a gel under subterranean formation conditions at a rate in excess of that of the first aqueous gel-forming composition, said composition introduced in an amount which is the remaining portion required for controlling the profile of the formation; wherein the gelation of said aqueous compositions proceeds in timed relation such that each composition gels at substantially the same point in time.

2. The method of claim 1, wherein said first gel-forming composition comprises:
   (a) water;
   (b) a viscosifying amount of a water-dispersible polymer; and
   (c) a crosslinking agent in an amount effective to cause gelation of the aqueous solution of said water-dispersible polymer.

3. The method of claim 1, wherein said at least second gel-forming composition comprises:
   (a) water;
   (b) a viscosifying amount of a water-dispersible polymer; and
   (c) a crosslinking agent in an amount effective to cause gelation of the aqueous solution of said water-dispersible polymer.

4. The method of claims 2 or 3, wherein said polymer is selected from the group consisting of polyacrylamides, polysaccharides, heteropolysaccharides, cellulose ethers and mixtures thereof.

5. The method of claim 4, wherein said crosslinking agent is selected from the group consisting of transition metal ions, phenolic resins, amino resins, mixtures of phenolic and aldehyde compounds and mixtures of naphtholic and aldehyde compounds.

6. The method of claim 5, wherein said phenolic mixture comprises about 1 to 99 weight percent of at least one phenolic compound selected from the group consisting of phenol, resorcinol, catechol, phloroglucinol, pyrogallol, 4,4'-diphenol and 1,3-dihydroxynaphthaline; and about 1 to about 99 weight percent of at least one aldehyde component selected from the group consisting of aliphatic monoaldehydes, aromatic monoaldehydes, aliphatic dialdehydes and aromatic dialdehydes.

7. The method of claim 5, wherein said amino resin is a condensate of formaldehyde and melamine.

8. The method of claim 5, wherein said phenolic compound is an esterified phenolic.

9. The method of claim 5, wherein said naphtholic compound is an esterified naphtholic.

10. The method of claim 4, wherein said crosslinking agent comprises compounds of a polyvalent metal selected from aluminum, zirconium or a metal of the first series of transition metals.

11. The method of claim 4, wherein said crosslinking agent comprises a salt of chromium$^{+3}$.

12. The method of claim 4, wherein said crosslinking agent comprises a chromium$^{+3}$ hydrosol.

13. The method of claim 4, further comprising the steps of:
   (d) injecting a flooding fluid into the formation that preferentially enters the low permeability zones; and
   (e) recovering fluids including oil from the formation via a production well.

14. The method of claim 13, wherein said flooding fluid is steam.

15. The method of claim 13, wherein said flooding fluid is water.

16. The method of claim 13, wherein said flooding fluid is carbon dioxide.

17. The method of claim 13, wherein said flooding fluid is water alternated with carbon dioxide.

18. The method of claim 13, wherein the gel-forming compositions introduced in steps (b) and (c) are injected via an injection well in fluid communication with the formation.

19. The method of claim 13, wherein the gel-forming compositions introduced in steps (b) and (c) are injected via a production well in fluid communication with the formation.

20. The method of claim 13, wherein the gel-forming compositions introduced in steps (b) and (c) are injected via both an injection well and a production well each in fluid communication with the formation.

* * * * *